May 26, 1964

SHIRO OKAMURA 3,134,853

MAGNETIC RECORDING AND REPRODUCING SYSTEM FOR PERIODICAL SIGNALS

Filed Jan. 26, 1961

2 Sheets-Sheet 1

INVENTOR
SHIRO OKAMURA
BY Roy C. Hopgood
ATTORNEY

May 26, 1964 SHIRO OKAMURA 3,134,853

MAGNETIC RECORDING AND REPRODUCING SYSTEM FOR PERIODICAL SIGNALS

Filed Jan. 26, 1961 2 Sheets-Sheet 2

INVENTOR
SHIRO OKAMURA
BY Roy C. Hopgood
ATTORNEY 3,134,853

MAGNETIC RECORDING AND REPRODUCING SYSTEM FOR PERIODICAL SIGNALS

Shiro Okamura, 26 2 Shirogane Daimachi Shiba, Minatoku, Tokyo, Japan

Filed Jan. 26, 1961, Ser. No. 85,067
13 Claims. (Cl. 178—6.6)

This invention relates in general to magnetic recording and reproducing systems and in particular to systems used in connection with periodically recurring groups of signals. Although the invention has application to periodical signals in general, it is especially useful in video signal circuits such as found, for example, in television transmitting systems, television recording systems, television receiving systems, and the like.

In television systems, visual information is transmitted by means of a periodically recurring group of video signals which represents the complete visual image seen by the television camera. Each group of video signals contains a large number of individual video signals (525 in the United States) each of which corresponds to one horizontal scan across the image seen by the television camera. The intensity of each individual signal rises or falls in accordance with the light level along its particular line, and the individual lines are vertically spaced so that they cover the entire visual image. Thus when 525 individual video signals have been transmitted, the entire visual image has been covered to form one frame of video information.

Since the image seen by the television camera is in motion, it is necessary to repeatedly scan the visual image and to transmit periodic frames of information at a frame rate fast enough to produce the illusion of continuous motion. In the United States, the standard frame rate is 30 frames per second, which means that a complete group of 525 individual video signals will be transmitted during each $\frac{1}{30}$ of a second. Since this rate of transmission is much faster than the movement of objects in the visual image, it will be apparent that adjacent frames of video signals will bear a close resemblance to each other, differing only by the amount of movement that has occurred during the $\frac{1}{30}$ of a second separating the two frames in time. This similarity has been utilized in the prior art as a means of creating fast or slow motion effects in the television image, as disclosed in my copending application Serial No. 66,770, filed on November 2, 1960, for a Signal Treating System.

In the above-noted copending application there is shown a device for recording video signals on a magnetic surface in accordance with a geometrical pattern which places each individual video signal of one frame adjacent to the corresponding video signal of the preceding and succeeding frames. In this arrangement, the signals from adjacent frames can be overlapped to give continuous magnetization to the magnetic surface, whereby the reproducing head of the recorder is not constrained to follow the path of the recording head, but can skip from one frame of signals to the next without fully reproducing any given frame of signals. This has the effect of speeding or retarding movement in the reproduced picture, depending on whether the reproducing head moves faster or slower than the recording head. This effect is also useful in converting the frame rate of the video signals to a higher or lower rate, depending again on the relative speeds of the recording and reproducing heads.

This invention is directed to improvements in recording and reproducing devices such as disclosed in said copending application, and more particularly to improvements in the geometrical pattern in which video signals are recorded on a magnetic surface and in the means for recording the video signals thereon. Accordingly, one object of this invention is to provide a recording and reproducing system for periodical signals. Another object of this invention is to provide a recording and reproducing system having improved signal recording means and improved signal recording patterns. Other objects and advantages of the invention will be apparent to those skilled in the art from the following description of one illustrative embodiment thereof taken in connection with the attached drawings, in which:

Figure 1:
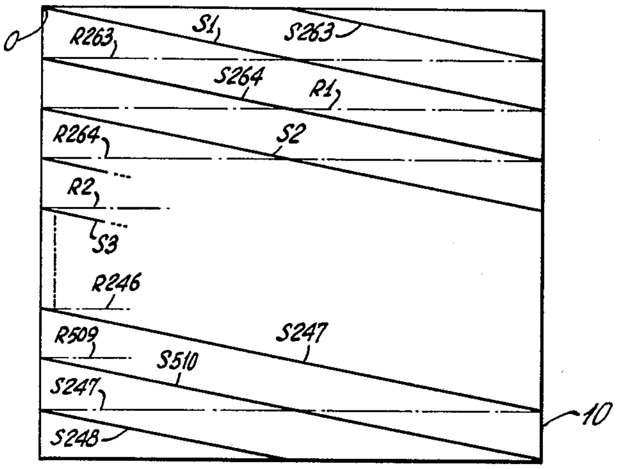
FIG. 1 is a diagram illustrating the scanning process in a television transmitter or receiver picture tube.

Most television systems employ an interlaced scanning system in which each frame of video information is transmitted in two sequential fields, each field covering alternate horizontal scans across the visual image. This interlacing is illustrated in FIG. 1, where a rectangular frame 10 is shown covered by a sequence of horizontal sweep lines S1 through S510 and corresponding sweep return lines R1 through R509. These lines show the path followed by a moving spot which scans across the visual field from left to right and from top to bottom. The left to right movement, or horizontal sweep, is much faster than the top to bottom movement, or vertical sweep, and the horizontal retrace (right to left) is much faster than the vertical retrace (bottom to top). At the beginning of each frame of video signals, the spot starts at 0 and scans from left to right along horizontal sweep line S1, generating a video signal whose amplitude varies according to the light intensity under the spot. Horizontal sweep line S1 is declined downward at an angle, due to the effect of the vertical sweep, so when the spot reaches the right hand side of the visual frame 10 it is lower than its starting point. The spot is then quickly returned to the left hand side along retrace line R1 and repeats its horizontal sweep along line S2. The video signal is blanked out during the retrace time, so that video signals are generated only during the sweep times.

Thus the spot is swept from left to right across the visual frame 10, dropping lower with each horizontal sweep until it reaches the bottom of visual frame 10. Since the horizontal sweeps are declined downward, the spot will reach the bottom in the middle of the sweep time corresponding to horizontal sweep line S248. This completes one field of video information in the interlaced scanning system, which requires 2 fields for a complete frame of video information.

After completing the first field, the spot is returned to the top of the visual frame 10 for the second video field, which is interlaced with the first video field. The vertical retrace is slow in comparison to the horizontal retraces, taking up several horizontal sweep times. In the example shown in FIG. 1, the vertical retrace covers sweep times S248 through 263. When the spot returns to the top of visual frame 10, it repeats the scanning process, but starts in the middle of the visual frame instead of the corner, and follows horizontal sweep lines which are interlaced between the sweep lines of the first field. The second field terminates at the end of the sweep time corresponding to horizontal sweep line S510, at which time one complete frame of video information has been transmitted and the spot returns to point 0 to repeat the process. Each field of video information is generated in $1/60$ of a second, and taken together the two fields give a frame rate of 30 frames per second.

Figure 2A:
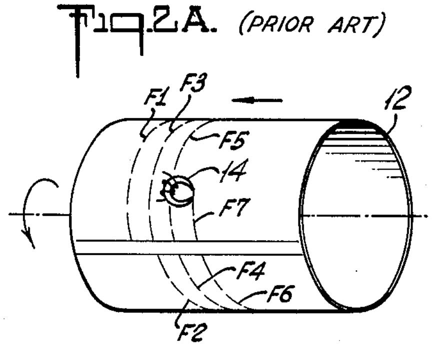
FIG. 2A. (PRIOR ART)
FIG. 2A is a perspective view of a magnetic drum and writing head as used in prior art devices.
Figure 3A:
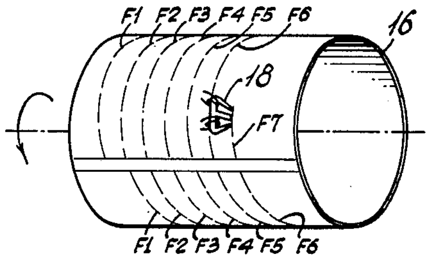
FIG. 3A is a perspective view of a magnetic drum and writing head used in one embodiment of this invention.
Figure 2B:
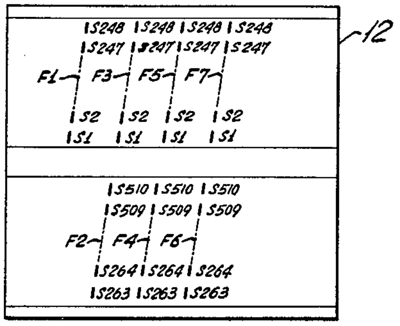
FIG. 2B. (PRIOR ART)
FIG. 2B is a developed view of the magnetic drum of FIG. 2A showing the signals recorded thereon in accordance with prior art techniques.
Figure 2C:
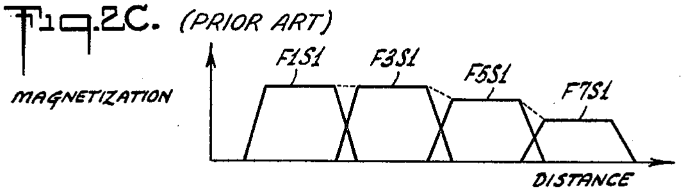
FIG. 2C. (PRIOR ART)
FIG. 2C is a graph showing the magnetization of axially adjacent areas on the drum surface shown in FIGS. 2A and 2B.

In accordance with the prior art techniques disclosed in my above-noted copending application, the video signals generated in this process are recorded on a magnetic surface with each signal of the complete frame adjacent to the corresponding signals of the preceding and succeeding frames. In one application of said prior art technique, as illustrated in FIGS. 2A, 2B, and 2C, the video signals are recorded on a magnetic drum 12 by a magnetic writing head 14 and other means not shown. Drum 12 is rotated and moved axially with respect to head 14 by means not shown to produce helical magnetization paths in which one turn contains a complete frame a video information. In the example given in FIGS. 2A and 2B, three complete frames of video information are shown, each comprising a group of horizontal scans S1 . . . S510, and each broken down into even and odd numbered fields F1–F6, as shown in the figures, in which the shaded areas represent vertical retrace times between fields. Each of the horizontal scans S1 . . . S510 is aligned with all of the corresponding scans along the surface of the drum, as shown in FIG. 2B, and the magnetization of corresponding scans is overlapped as shown in FIG. 2C to provided continuous magnetization across the surface of the drum. This allows the reproducing head, not shown, to slip sideways from one field to the next field without interrupting the video signal, as more fully explained in my above-noted copending application.

Figure 3B:
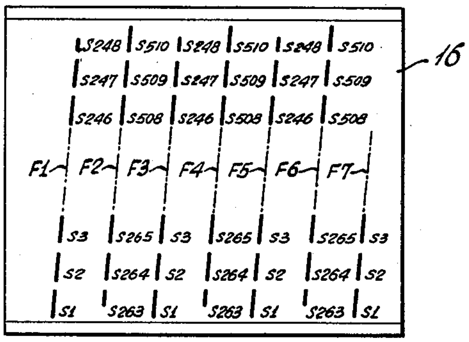
FIG. 3B is a developed view of the magnetic drum of FIG. 3A showing the signals recorded thereon in accordance with this invention.

This invention is similar to the above described prior art device in function, but it provides novel means for recording the video signals on the magnetic surface and a novel geometric configuration for the signals recorded thereon. In accordance with one embodiment of the invention, which is shown in FIGS. 3A, 3B, 4A, and 4B, the video signals are recorded on a magnetic drum 16 by a dual magnetic writing head 18. Drum 16 is rotated and moved axially with respect to head 18, by means not shown, to produce helical magnetization paths in which one turn contains one field of video information and two turns contains one frame of video information. As shown in FIG. 3B, the individual horizontal sweeps S1 . . . S510 of each video frame are not adjacent to corresponding horizontal sweeps of the preceding and succeeding frames, as in the prior art, but rather they are adjacent to the closest interlace sweep of the preceding and succeeding video fields F1–F6. This places S1 adjacent to S263 rather than S1, and S248 adjacent to S510 instead of S248.

Figures 4A, 4B, 5A, 5B, 6, 7A, 7B, 7C:
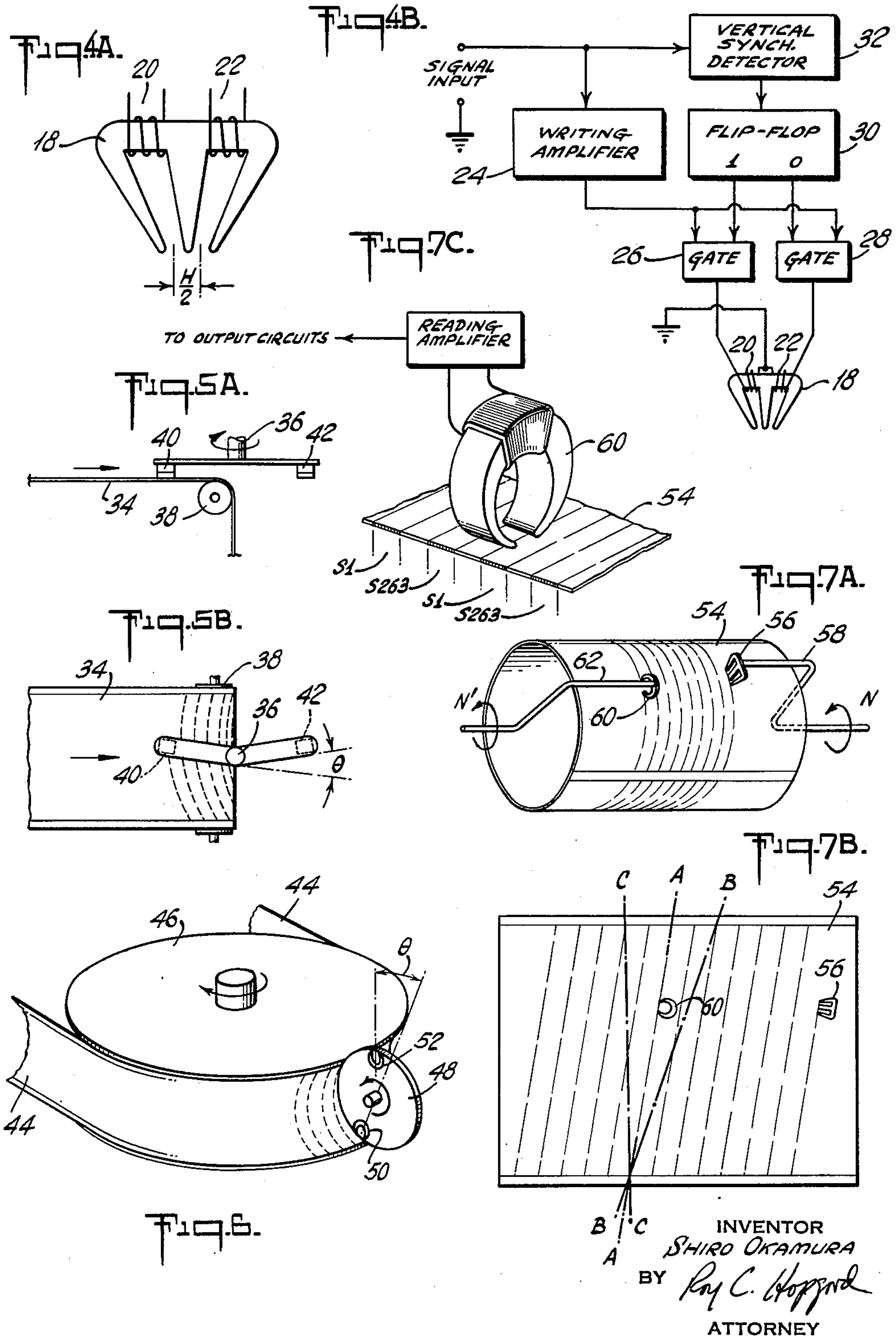
FIG. 4A is an elevation view of one magnetic writing head suitable for use in connection with this invention.
FIG. 4B is a block diagram showing one suitable control circuit for the magnetic writing head of FIG. 4A.
FIG. 5A is an elevation view of a second magnetic recording device suitable for use in connection with this invention.
FIG. 5B is a plan view of the magnetic recording system of FIG. 5A.
FIG. 6 is a perspective view of a third magnetic recording device suitable for use in connection with this invention.
FIG. 7A is a perspective view of a magnetic recording and reproducing device suitable for use in connection with this invention.
FIG. 7B is a developed view of the cylindrical surface shown in FIG. 7A.
FIG. 7C is a perspective view of one suitable reproducing head for use in connection with this invention.

Since the two interlaced fields which comprise a frame are out of phase with respect to each other, it is necessary to counteract this phase difference to get correct overlap of the recorded signals. If a single writing head were used for all of the fields, the magnetization areas of the individual signals would be staggered with respect to each other because the first field of each frame starts at the beginning of a horizontal sweep and the second field starts in the middle of a horizontal sweep. In the embodiment shown in FIG. 3A, this is done by spacing the magnetic gaps of dual writing head 18 by a distance equal to one half the horizontal sweep length H, as shown in FIG. 4A, and switching the video input from one winding to the other on alternate fields of the video input signal. Thus winding 20 of dual head 18 would receive the input signal during field F1, winding 22 during field F2, winding 20 during field F3, and so one. This produces the longitudinal alignment of signal magnetization areas shown in FIG. 3B. Satisfactory performance may also be achieved by spacing the magnetic gaps of of the writing head 18 by a distance equal to odd integral multiples of the value H/2.

FIG. 4B shows one suitable circuit for performing the above-described switching between windings 20 and 22. The video input signal, which contains vertical synchronizing signals indicating the start of a new field, is applied to a writing amplifier 24, whose output signal is coupled through gates 26 and 28 to windings 20 and 22. Gates 26 and 28 are opened alternately, in complementary relation to each other, by a control flip-flop 30 which is triggered by a vertical synch detector circuit 32. The synchronizing signals which signify a new video field are detected by circuit 32, which switches flip-flop 30 and shifts the video input signal from one winding to the other. Circuits 24 through 32 can be any suitable circuits for mechanizing their respective functions, many of which are well known to those skilled in the art.

FIGS. 5A and 5B show a second embodiment of the invention in which the video signals are recorded as semicircular arcs on a magnetic tape 34 by a rotating head assembly 36. Tape 34 is moved linearly around a roller 38, and head assembly 36 scans two angularly spaced heads 40 and 42 across tape 34 near roller 38. Each head magnetizes an arc across the tape surface, and each arc contains one complete field of video information. The heads 40 and 42 are angularly spaced by an angle $\theta$ to counteract the staggering of adjacent signals, as described above, and the video input signals to the heads are switched on alternate fields by a switching circuit such as shown in FIG. 4B.

FIG. 6 shows a third embodiment of the invention in which a magnetic tape 44 is driven around a capstan 46 whose periphery is indented to accommodate a rotating writing disc 48 carrying angularly spaced writing heads 50 and 52. In this arrangement, heads 50 and 52 trace linear paths across the surface of tape 44, each path corresponding to one field of video information. Heads 50 and 52 are angularly spaced by an angle $\theta$ to counteract the staggering of adjacent signals, and they are switched on alternate fields like heads 40 and 42. These examples, however, should not be considered as a limitation on this invention, since the writing mechanism of this invention can be embodied in many other magnetic writing devices, as will be readily understood by those skilled in the art.

FIGS. 7A and 7B show another embodiment of the invention which includes a reproducing head as well as a dual recording head. This embodiment utilizes a magnetic drum 54 and dual recording head 56 similar to the drum and recording head shown in FIGS. 3A, 3B, 4A, and 4B. Drum 54, however, is held stationary and head 56 is rotated and moved axially across the drum surface by a crank arm 58, which is rotated at a scanning speed N by means not shown. The two windings of head 56 are switched by a circuit similar to the circuit of FIG. 4B, and the magnetization pattern written on the surface of drum 54 is identical to the pattern shown in FIG. 3B.

Drum 54 is also fitted with a single reproducing head 60 which is rotated and moved axially with respect to drum 54 by a crank arm 62, which is rotated by means not shown at a speed N'. Crank arm 62 rotates independently of crank arm 58, and speed N' can be set to be equal to speed N, or it can be made faster or slower if desired. When speed N' is equal to speed N, reproducing head 60 follows in the track A—A of recording head 56 and the reproduced signal is identical with the recorded signal. But when speed N' differs from speed N, the motion in the reproduced image will differ from the motion in the recorded signals and the scanning rate will be changed.

Referring to FIG. 7B, if reproducing head 60 revolves twice as fast as recording head 56, it will follow the path B—B, moving from one recorded track to the adjacent recorded track in the middle of a revolution. This produces two vertical output sweeps for each vertical input sweep, which doubles the frame rate of the output signal and halves the image movement speed. Therefore, this invention can be used to produce slow motion effects or to convert to a higher frame rate by rotating the reproducing head faster than the recording head. And since the surface of the drum is continuously recorded, the cross-over from one magnetic track to another can be made at any point, whereby the reproducing speed can be varied continuously or set to any desired speed.

If the reproducing head 60 revolves one-half as fast as recording head 56, it will follow path C—C, which produces one vertical output sweep for every two vertical input sweeps, having the frame rate and doubling the image movement speed. Thus the invention can be used to produce fast motion effects or to convert to a lower frame rate by rotating the reproducing head slower than the recording head. If recording and reproducing occur simultaneously, as shown in FIG. 7A, the fast motion is limited to the time period separating the reproducing and recording heads, but if the signals are reproduced in a separate reproducing mechanism there is no such limitation.

Reproducing head 60 is preferably wide in relation to the spacing between adjacent magnetized tracks, as shown in FIG. 7C, so that the head can move sideways from one track to the next without any interruption of the video signal. In addition, the magnetization curves of adjacent signals are preferably overlapped, as shown in FIG. 2C, to provide continuous magnetization of the drum surface along its longitudinal direction. This combination provides the smoothest transition from one track to another and also uses the available magnetizing surface to best advantage. It should be noted that the magnetization level from one magnetized track to the next is substantially uniform, because each pair of adjacent signals are also adjacent sweeps across the visual image, and that any change from track to track results from movement of the image in the $\frac{1}{60}$ of a second separating the adjacent tracks. Therefore, no appreciable distortion will be introduced in skipping from track to track until the rate of movement becomes very high with respect to the frame rate.

From the foregoing description it will be apparent that this invention provides a recording and reproducing system in which periodical signals can be recorded at one rate and reproduced at a different rate. It will also be apparent that this invention provides a recording and reproducing system having improved signal recording means and improved signal recording patterns. And it should be understood that this invention is by no means limited to the specific structures disclosed herein by way of example, since many modifications can be made in the structure shown without departing from the basic teaching of this invention. For example, in the embodiment shown in FIG. 7A, the magnetic drum 54 could be rotated and the heads 56 and 60 moved longitudinally if desired, or the drum could be moved longitudinally and the heads rotated without changing the fundamental operation of the circuit. Reproducing heads similar in operation to head 60 could be provided for the embodiments shown in FIGS. 5 and 6, and many other suitable switching circuits could be used in place of the circuit shown in FIG. 4B. These and many other modifications will be apparent to those skilled in the art, and this invention includes all modifications falling within the scope of the following claims.

I claim:

1. A magnetic recording system for recording periodically recurring groups of signals on a magnetic storage surface, said recording system comprising a magnetic storage surface, two magnetic recording heads mounted in fixed relation with respect to each other adjacent to said magnetic storage surface, scanning means operable to produce relative motion between said heads and said surface, said scanning means being adapted to define substantially parallel tracks across said storage surface each comprising a plurality of separate segments of given length, the magnetic gap of one of said heads being spaced from the magnetic gap of the other of said heads by a distance equal to one-half said given length, input means adapted to receive periodically recurring groups of signals and to apply said signals to said heads, and switching means operable to switch said signals from one head to the other in synchronism with the period thereof.

2. A magnetic recording system for recording periodically recurring groups of signals on a magnetic storage surface, said recording system comprising a magnetic storage surface, two magnetic recording heads mounted in fixed relation with respect to each other adjacent to said magnetic storage surface, scanning means operable to produce relative motion between said heads and said surface, said scanning means being adapted to produce a periodic relative motion synchronized with the period of said signals, said scanning means being further adapted to define substantially parallel tracks across said magnetic storage surface, each track thereof corresponding to one group of said signals and every pair of adjacent tracks corresponding to adjacent groups of said signals, input means adapted to receive periodically recurring groups of signals and to apply said signals to said heads, and switching means operable to switch said signals from one head to the other in synchronism with the period thereof.

3. The combination defined in claim 2 wherein said switching means is adapted to switch said signals from one head to the other between alternate tracks of said parallel tracks.

4. The combination defined in claim 3 wherein the fixed relation between said heads is chosen to place corresponding signals of adjacent signal groups in lateral alignment along said magnetic storage surface.

5. The combination defined in claim 4 wherein said scanning means is adapted to laterally overlap the magnetization along any one of said parallel tracks with the magnetization along the adjacent tracks, whereby said magnetic storage surface is continuously magnetized in the direction lateral to said tracks.

6. A video signal recording system for recording successive fields of an interlaced video signal on a magnetic storage surface, said interlaced video signal comprising a plurality of successive horizontal scan signals each carrying video information, said horizontal scan signals being divided into recurring groups each corresponding to one frame of video information, and each frame of signals being divided into two recurring sections each corresponding to one interlaced field of the frame, said video recording system comprising a magnetic storage surface, two magnetic recording heads mounted in fixed relation to each other adjacent to said storage surface, scanning means operable to produce relative motion between said heads and said surface, said scanning means being adapted to produce periodic relative motion synchronized with the period of said interlaced fields, input means adapted to receive said horizontal scan signals and to apply said signals to said heads, and switching means operable to switch said signals from one head to the other in synchronism with the period of said interlaced fields.

7. The combination defined in claim 6 wherein said scanning means is adapted to define substantially parallel tracks across said magnetic storage surface, each track thereof corresponding to one interlaced field of said signals, and every pair of adjacent tracks corresponding to adjacent interlaced fields of said signals.

8. The combination defined in claim 7 wherein said heads are disposed adjacent one another, the fixed distance between said heads being a value such as to cause corresponding horizontal scan signals of adjacent interlaced fields to be formed in lateral alignment along said magnetic storage surface as relative motion is produced between said surface and said heads.

9. The combination defined in claim 8 wherein said scanning means is adapted to laterally overlap the magnetization produced by said heads along any one of said parallel tracks with the magnetization produced by said heads along the adjacent tracks, whereby said magnetic storage surface is continuously magnetized in the direction lateral to said tracks.

10. A video signal recording system for recording successive fields of an interlaced television video signal on a magnetic storage surface, said video signal recording system comprising a magnetic storage surface, a pair of magnetic recording heads spaced in fixed relationship to one another and mounted adjacent to said magnetic storage surface, scanning means operable to move said heads across said surface to trace substantially parallel tracks thereacross, switching means adapted to receive said interlaced television video signal and to apply said signal alternately to said recording heads, said scanning means being synchronized with the interlaced field period of said video signal whereby each track across said magnetic surface corresponds to one interlaced field of said video signal, and synchronizing means operable to laterally align corresponding signal portions of adjacent tracks on said magnetic surface.

11. A video signal frame rate converter comprising a recording system as defined in claim 10 and also including a reproducing head mounted adjacent to said magnetic storage surface, second scanning means operable to move said reproducing head across said surface, and means for adjusting the scanning speed of said second scanning means.

12. The combination defined in claim 11 wherein said second scanning means is adapted to move said reproducing head in substantially parallel tracks across said magnetic storage surface, and wherein the tracks followed by said reproducing head are skewed with respect to the tracks followed by said recording heads.

13. The combination defined in claim 10 wherein said recording heads are spaced by a distance corresponding to an odd integral multiple of one-half the horizontal sweep time of said video signal, said switching means operating to switch said input signal from one magnetic recording head to the other during the vertical retrace time of said video signals.

References Cited in the file of this patent

UNITED STATES PATENTS

| | | |
|---|---|---|
| 2,690,473 | Cooley | Sept. 28, 1954 |
| 2,773,120 | Masterson | Dec. 4, 1956 |
| 2,813,924 | Coutant et al. | Nov. 19, 1957 |
| 2,860,179 | Blackstone | Nov. 11, 1958 |
| 2,876,295 | Irby | Mar. 3, 1959 |
| 2,965,708 | Witt | Dec. 20, 1960 |